US012729768B2

(12) United States Patent
Gu

(10) Patent No.: US 12,729,768 B2
(45) Date of Patent: Sep. 8, 2026

(54) HIGH-PRESSURE VALVE AND HIGH-PRESSURE WATER GUN

(71) Applicant: SHANGHAI PEAKPOWER MANUFACTURING CO.,LTD., Shanghai (CN)

(72) Inventor: JiangYong Gu, Shanghai (CN)

( * ) Notice: Subject to any disclaimer, the term of this patent is extended or adjusted under 35 U.S.C. 154(b) by 27 days.

(21) Appl. No.: 18/967,575

(22) Filed: Dec. 3, 2024

(65) Prior Publication Data

US 2025/0354612 A1 Nov. 20, 2025

(30) Foreign Application Priority Data

May 20, 2024 (CN) ......................... 202410622718.8

(51) Int. Cl.

| | |
|---|---|
| ***F16K 1/14*** | (2006.01) |
| ***B05B 7/02*** | (2006.01) |
| ***B05B 9/01*** | (2006.01) |
| ***F16K 1/52*** | (2006.01) |
| ***F16K 39/02*** | (2006.01) |

(52) U.S. Cl.

CPC .................. *F16K 1/14* (2013.01); *B05B 7/02* (2013.01); *B05B 9/01* (2013.01); *F16K 1/52* (2013.01); *F16K 39/02* (2013.01)

(58) Field of Classification Search

CPC ........... B05B 7/02; B05B 9/01; B05B 12/002; B05B 1/3026; F16K 1/00; F16K 1/14; F16K 1/32; F16K 1/52; F16K 17/04; F16K 17/20; F16K 27/02; F16K 39/02

See application file for complete search history.

(56) References Cited

U.S. PATENT DOCUMENTS

| | | | | |
|---|---|---|---|---|
| 1,524,283 A * | 1/1925 | Beach | B05B 12/002 | 251/232 |
| 3,327,949 A * | 6/1967 | Eull | B05B 15/00 | 239/443 |
| 4,915,304 A * | 4/1990 | Campani | A01M 7/0046 | 239/581.1 |
| 5,460,203 A * | 10/1995 | Smith | B05B 7/12 | 239/528 |
| 6,779,742 B2 * | 8/2004 | Kitajima | B05B 7/1209 | 251/285 |
| 6,877,681 B2 * | 4/2005 | Hartle | B05B 7/066 | 239/708 |
| 11,052,412 B2 * | 7/2021 | Becker | B05B 7/2416 | |

* cited by examiner

*Primary Examiner* — Daphne M Barry

(57) ABSTRACT

The invention relates to a high-pressure valve and a high-pressure water gun. The high-pressure water gun includes a high-pressure valve. A buffer cavity and a pressure-reducing cavity are arranged in an adjusting cavity of the high-pressure valve; the buffer cavity is used to buffer air resistance, and the pressure-reducing cavity is used to offset the pressure of high-pressure water. Users only need to apply a small force to the wrench part of the high-pressure water gun to switch on the high-pressure water gun, solving the problem of hand fatigue that is prone to occur in the use of existing high-pressure water guns.

16 Claims, 3 Drawing Sheets

HIGH-PRESSURE VALVE AND HIGH-PRESSURE WATER GUN

TECHNICAL FIELD

The invention belongs to the technical field of high-pressure cleaning, and particularly relates to a high-pressure valve and a high-pressure water gun.

TECHNICAL BACKGROUND

When the existing high-pressure water gun is used for cleaning, the high pressure of the high-pressure water entering the high-pressure water gun impacts the valve core of the water outlet valve, so that the valve core closes the water outlet valve. Therefore, in order to keep the water outlet valve in the high-pressure water gun in an open state, the cleaning personnel need to hold the trigger vigorously all the time so that the driving force transmitted by the trigger to the valve core through the valve rod overcomes the high-pressure impact force of the high-pressure water on the valve core. When the cleaning personnel use the high-pressure water gun for a long time, the cleaning personnel's hands are prone to fatigue, and the longer the use time and the higher the water pressure sprayed by the high-pressure water gun, the more fatigued the cleaning personnel's hands become, even causing permanent damage to their hands.

INVENTION CONTENT

In order to overcome the defects of the existing technology, the invention provides a high-pressure valve and a high-pressure water gun, wherein the high-pressure water gun comprises the high-pressure valve, so that the user only needs to apply a small force to the wrench part of the high-pressure water gun to switch on the high-pressure water gun, and the hands are not easily fatigued.

The technical scheme adopted by the invention for solving the technical problems is as follows:

A high-pressure valve, comprises a valve body, wherein the valve body comprises a valve seat cavity, a valve rod cavity and an adjusting cavity; the valve rod cavity is arranged between the adjusting cavity and the valve seat cavity; the valve rod cavity is communicated with the valve seat cavity through a first communicating hole, and is communicated with the adjusting cavity through a second communicating hole; the valve body is also provided with a water inlet and a water outlet, wherein the water inlet is communicated with the valve seat cavity; and the water outlet is communicated with the valve rod cavity; the valve seat cavity is internally provided with a valve core and an elastic piece, wherein the elastic piece provides an acting force for the valve core to move towards the first communicating hole; the valve rod is arranged in the valve rod cavity, wherein two ends of the valve rod are respectively inserted into the first communicating hole and the second communicating hole; an adjusting assembly is arranged in the adjusting cavity; one end of the adjusting assembly is connected with the valve rod, and the another end of the adjusting assembly extends to the outside of the valve body; the adjusting assembly comprises an adjusting head and an adjusting rod, wherein the adjusting head is arranged at one end of the adjusting rod close to the valve rod, the a radial section of the adjusting head is larger than that of the adjusting rod; the adjusting head divides the adjusting cavity into a pressure-reducing cavity and a buffer cavity; and the pressure-reducing cavity is positioned at one side of the buffer cavity far away from the valve rod cavity and is communicated with the water inlet or the water outlet; and the buffer cavity is communicated with the external environment.

Further, a communicating pipe is arranged in the valve body and is used for communicating the pressure-reducing cavity with the water inlet or communicating the pressure-reducing cavity with the water outlet.

Further, the communicating pipe comprises a water outlet pipe and a first inclined water outlet pipe. One end of the water outlet pipe is communicated with the water inlet, and another end of the water outlet pipe is communicated with the first inclined water outlet pipe. And one end of the first inclined water outlet pipe far away from the water outlet pipe is communicated with the pressure-reducing cavity.

Further, the central axis of the water outlet pipe is parallel to the central axis of the valve rod cavity, and the first inclined water outlet pipe extends obliquely toward the water outlet pipe.

Further, a second sealing plug is arranged at one end of the valve seat cavity away from the valve rod cavity. The second sealing plug is of a cylindrical structure. An opening is arranged at one end of the second sealing plug close to the valve rod cavity, and one end of the second sealing plug away from the valve rod cavity is sealed. The elastic piece and at least a part of the valve core are arranged inside the second sealing plug, and the central axis of the first communicating hole coincides with the central axis of the second sealing plug.

Further, the cylinder wall of the second sealing plug is provided with a communicating inlet, and aperture of the communicating inlet is smaller than outer diameter of the valve core.

Further, a third sealing plug is arranged on one side of the adjusting cavity away from the valve rod cavity. The third sealing plug is provided with a mounting hole through which the adjusting rod passes, and a first pressure-reducing stopper is arranged on one side of the third sealing plug close to the adjusting cavity.

Further, the pressure-reducing cavity is formed by enclosing the first pressure-reducing stopper and the adjusting head. The first pressure-reducing stopper is provided with a plurality of water inlet slots. The water inlet slots are radially and uniformly distributed, and the high-pressure water flows into the pressure-reducing cavity after passing through the communicating pipe and the water inlet slots in turn, so as to balance the pressure of the high-pressure water in the valve seat cavity.

The present invention also provides a high-pressure water gun, comprising a high-pressure valve as described above.

The Beneficial Effects of the Present Invention

The invention provides a high-pressure valve and a high-pressure water gun, wherein the high-pressure water gun comprises a high-pressure valve; the high-pressure valve is provided with a pressure-reducing cavity and a buffer cavity; the buffer cavity is communicated with the atmosphere to buffer air resistance, and the pressure-reducing cavity is communicated with a water inlet to offset the pressure of high-pressure water in a valve seat cavity and a valve rod cavity, so that users only need to apply a small force to the wrench part of the high-pressure water gun to switch on the high-pressure water gun, solving the problem of hand fatigue that is prone to occur in the use of existing high-pressure water guns.

DESCRIPTION OF MARKS IN FIGURES

1. Valve body; 11. First communicating hole; 12. Second communicating hole; 13. Water inlet; 14. Water outlet; 15. First through hole; 16. Communicating pipe; 161. Water outlet pipe; 162. First inclined water outlet pipe; 164. First sealing plug;
2. Valve seat cavity; 21. Valve core; 22. Elastic piece; 23. Second sealing plug; 231. First sealing groove; 232. First sealing ring; 233. Communicating inlet; 24. Valve seat; 25. Second sealing ring;
3. Valve rod cavity; 31. Valve rod;
4. Adjusting cavity; 41. Pressure-reducing cavity; 42. Buffer cavity; 43. Adjusting assembly; 431. Adjusting head; 4311. Sealing ring; 432. Adjusting rod; 44. Third sealing plug; 441. Fourth sealing ring; 442. Fifth sealing ring; 443. Second sealing groove; 45. First pressure-reducing stopper; 451. Water inlet slot; 46. Third sealing ring; 461. First washer; 47. First adjusting cylinder; 471. Sixth sealing ring; 472. First buffer through hole; 48. Seventh sealing ring; 481. Second washer;

DETAILED DESCRIPTION OF THE EMBODIMENTS

Below is a further detailed description of the present invention based on the figures.

The present embodiment only shows an explanation of the present invention and it is not a limitation to the present invention. The skilled in the art can make modifications to this embodiment as needed without making any creative contributions after reading this specification, which are always protected by the patent law as long as they are within the scope of the claims of the present invention.

It should be noted that when an element is called as being "fixed to" or "arranged on" another element, it can be directly on the other element or indirectly on the other element. When an element is called as being "connected to" another element, it can be directly connected to the other element or indirectly connected to the other element.

It should be noticed that the terms "length", "width", "above", "below", "front", "rear", "left", "right", "vertical", "horizontal", "top", "bottom", "inside" and "outside" which indicates the orientations or positional relationships are based on the orientations or positional relationships shown in the figures. They are only for facilitating describing the present invention and simplifying the description, rather than indicating or implying that the device or component must have a specific orientation, construct and operate in a specific orientation, therefore, it understood as a limitation of the present invention.

In addition, the terms "first" and "second" are used for descriptive purposes only and cannot be understood as indicating or implying relative importance or implicitly indicating the quantity of indicated technical features. Therefore, a feature defined as "first" and "second" may explicitly or implicitly include one or more of these features. In the description of the present invention, "a plurality of" means two or more, unless otherwise specifically defined.

Embodiment I

Figure 1:
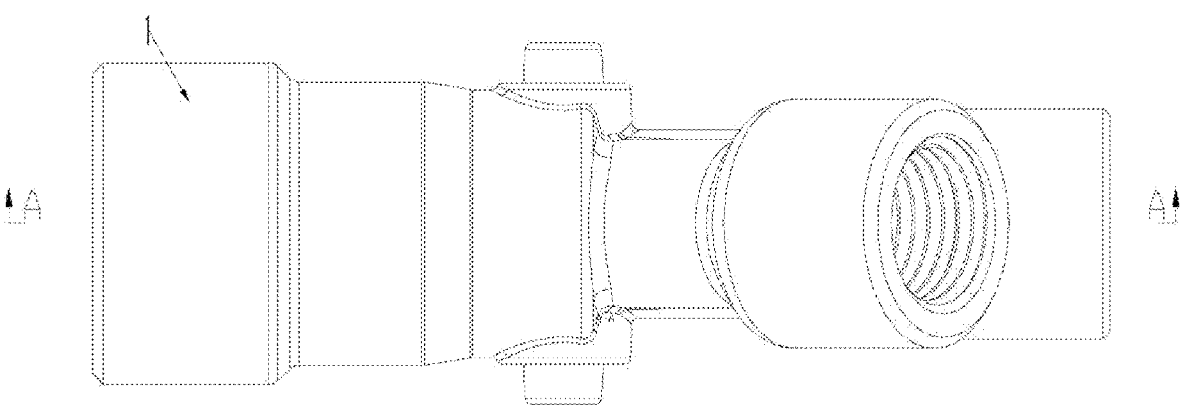
FIG. 1 is a schematic view of a valve body in the embodiment I of the present invention.
Figure 2:
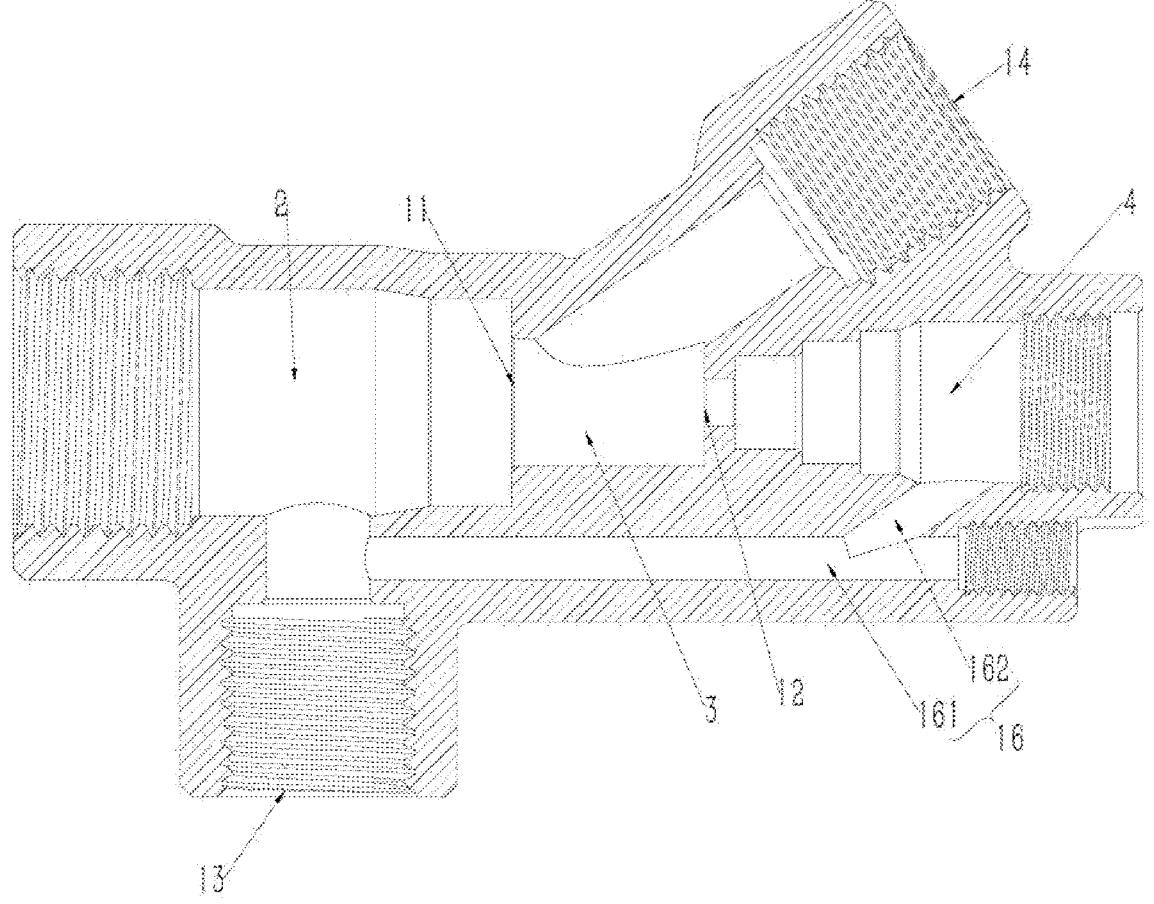
FIG. 2 is a sectional view of A-A in FIG. 1.
Figure 3:
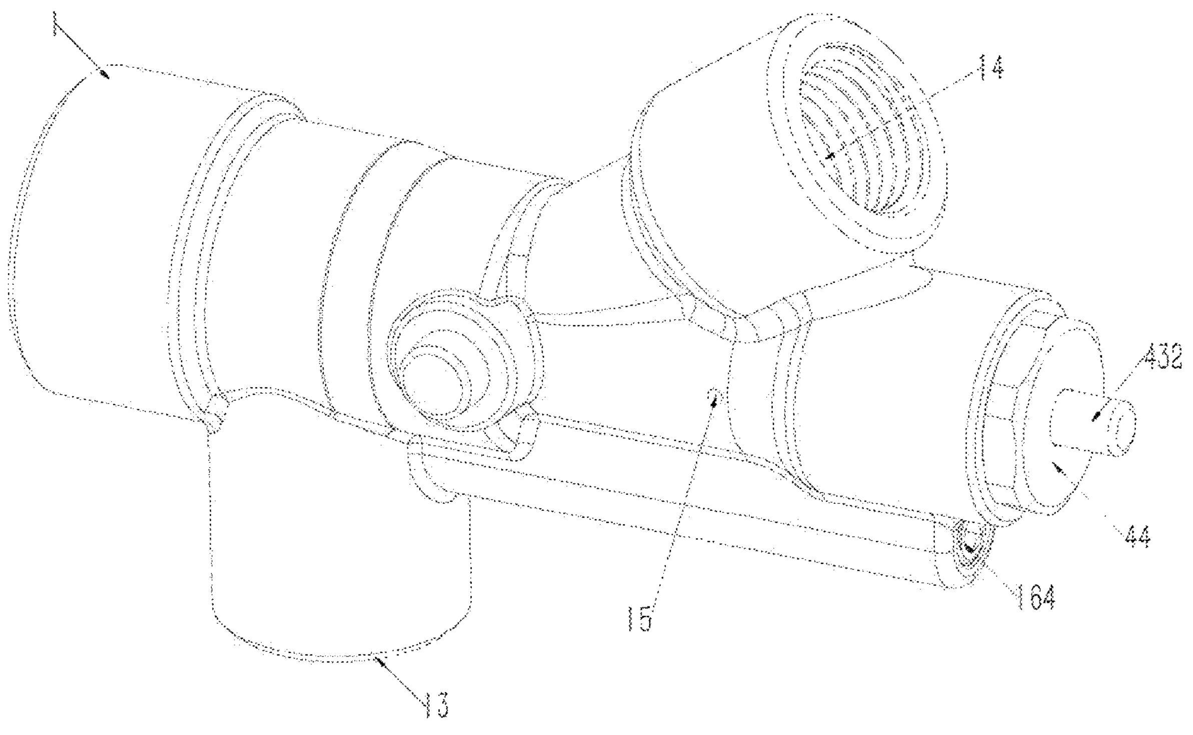
FIG. 3 is an overall schematic view of a high-pressure valve in the embodiment I of the present invention.
Figure 4:
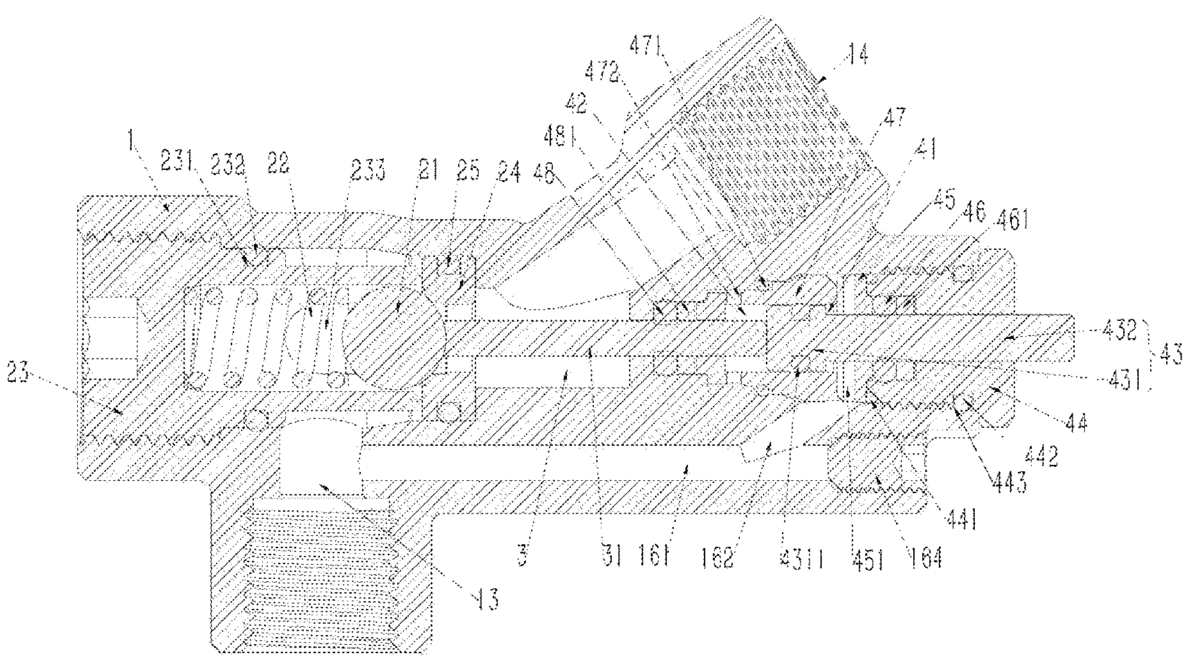
FIG. 4 is a sectional view of the high-pressure valve in the embodiment I of the present invention.
Figure 5:
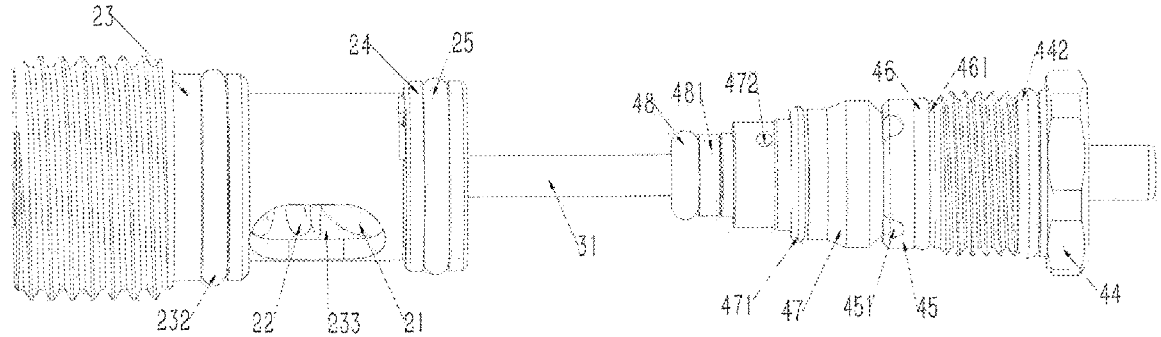
FIG. 5 is an overall schematic view of the internal structure of the high-pressure valve in the embodiment I of the present invention.

Referring to FIGS. 1-5, the embodiment provides a high-pressure valve, comprising a valve body 1, wherein the valve body 1 comprises a valve seat cavity 2, a valve rod cavity 3 and an adjusting cavity 4; the valve rod cavity 3 is arranged between the adjusting cavity 4 and the valve seat cavity 2; the valve rod cavity 3 is communicated with the valve seat cavity 2 through a first communicating hole 11 and communicated with the adjusting cavity 4 through a second communicating hole 12.

The valve body 1 is also provided with a water inlet 13 and a water outlet 14, wherein the water inlet 13 is communicated with the valve seat cavity 2; and the water outlet 14 is communicated with the valve rod cavity 3; high-pressure water can enter the valve seat cavity 2 inside the valve body 1 along the water inlet 13, enter the valve rod cavity 3 through the first communicating hole 11 between the valve seat cavity 2 and the valve rod cavity 3, and finally be ejected from the water outlet 14.

The valve seat cavity 2 is internally provided with a valve core 21 and an elastic piece 22, wherein the elastic piece 22 provides an acting force for the valve core 21 to move towards the first communicating hole 11, so that the valve core 21 blocks the first communicating hole 11 to isolate the valve seat cavity 2 and the valve rod cavity 3, and the high-pressure water entering the valve seat cavity 2 cannot flow into the valve rod cavity 3.

The valve rod 31 is arranged in the valve rod cavity 3, wherein two ends of the valve rod 31 are respectively inserted into the first communicating hole 11 and the second communicating hole 12; an adjusting assembly 43 is arranged in the adjusting cavity 4; one end of the adjusting assembly 43 is connected with the valve rod 31, and another end of the adjusting assembly 43 extends to the outside of the valve body 1.

One end of the adjusting assembly 43 extending to the outside of the valve body 1 is used as a force application end, and the external force can be applied to the end, so that the adjusting assembly 43 moves towards the valve rod cavity 3, and the valve rod 31 is driven to move towards the valve seat cavity 2; the end of the valve rod 31 close to the valve seat cavity 2 pushes away the valve core 21 blocking the first communicating hole 11, so that the valve seat cavity 2 is communicated with the valve rod cavity 3, thereby allowing the water inlet 13 to communicate with the water outlet 14.

The high-pressure water entering into the valve seat cavity 2 will generate an impact force on the valve core 21, so that the valve core 21 moves toward the first communicating hole 11. Therefore, the user needs to overcome the impact force of the high-pressure water on the valve core 21 in order to keep the valve seat cavity 2 and the valve rod cavity 3 in a communicated state, in addition to applying a driving force to the adjusting assembly 43 to push the valve rod 31 to move.

Preferably, the adjusting assembly 43 comprises an adjusting head 431 and an adjusting rod 432, wherein the adjusting head 431 is arranged at one end of the adjusting rod 432 close to the valve rod 31, a radial section of the adjusting head 431 is larger than that of the adjusting rod 432; the adjusting head 431 divides the adjusting cavity 4 into a pressure-reducing cavity 41 and a buffer cavity 42; the pressure-reducing cavity 41 is positioned at one side of the buffer cavity 3 far away from the valve rod cavity 42 and is communicated with the water inlet 13; and the buffer cavity 42 is communicated with the external environment. Specifically, the valve body 1 is provided with a first through hole 15, and the buffer cavity 42 is communicated with the external environment through the first through hole 15.

Understandably, when the water inlet 13 of the high-pressure valve provided in this embodiment is connected to the high-pressure water, a part of the high-pressure water enters the valve seat cavity 2, and the other part of the high-pressure water enters the pressure-reducing cavity 41. When the user applies a force to the force application end of the adjusting assembly 43, the valve rod 31 pushes the valve core 21, so that the valve seat cavity 2 is communicated with the valve rod cavity 3, and the high-pressure water in the valve seat cavity 2 flows into the valve rod cavity 3 and is sprayed out along the water outlet 14. The water pressure of the water inlet 13, the water pressure in the valve rod cavity 3 and the water pressure in the pressure-reducing cavity 41 are the same, and the force applied by the user to the force application end only needs to overcome the air resistance generated by the air in the buffer cavity 42 and the force acting on the valve core 21 for pushing the valve core 21 to reset and block the communicating hole, so that the valve rod cavity 3 and the valve seat cavity 2 can be kept in the communication state. The force acting on the valve core 21 to push the valve core 21 to return and block the communicating hole refers to the force applied by the elastic piece 22 to the valve core 21.

The first through hole 15 communicated with the external atmosphere is arranged in the buffer cavity 42, the air in the buffer cavity 42 can be exhausted to the atmosphere outside the valve body 1 through the first through hole 15, therefore, the air resistance of the air in the buffer cavity 42 acting on the adjusting head 431 remains unchanged, and the user only needs to overcome the acting force of the elastic piece 22 on the valve core 21. That is, the high-pressure valve can be opened so that the water inlet 13 and the water outlet 14 inside the high-pressure valve are communicated. When the air in the buffer cavity 42 is completely discharged, the adjusting head 431 is pressed against and attached to the inner end wall of the adjusting cavity 4 near the valve rod cavity 3, and the high-pressure valve is in a fully open state.

Further, the valve body 1 is internally provided with a communicating pipe 16 for communicating the pressure-reducing cavity 41 and the water inlet 13.

In specific, the communicating pipe 16 comprises a water outlet pipe 161 and a first inclined water outlet pipe 162, wherein one end of the water outlet pipe 161 is communicated with the water inlet 13, and another end of the water outlet pipe 161 is communicated with the first inclined water outlet pipe 162; and one end of the first inclined water outlet pipe 161 far away from the water outlet pipe is communicated with the pressure-reducing cavity 41. During production, the water outlet pipe 161 and the first inclined water outlet pipe 162 can be respectively formed on the valve body 1 by using a hole saw to reduce the processing difficulty of the communicating pipe 16, thereby reducing the processing difficulty of the valve body 1. In addition, a first sealing plug 164 is installed in a processing port of the water outlet pipe 161 near the first inclined water outlet pipe 162, and the processing port of the water outlet pipe 161 is sealed by the first sealing plug 164, so that the high-pressure water in the communicating pipe 16 can be prevented from overflowing to the outside of the valve body 1 through the processing port.

Further, the central axis of the water outlet pipe 161 is parallel to the central axis of the valve rod cavity 3, and the first inclined water outlet pipe 162 extends obliquely toward the water inlet area, which reduces the processing difficulty of the communicating pipe 16, thereby reducing the processing difficulty of the valve body 1 and effectively improving the production efficiency of the high-pressure valve.

Preferably, in the embodiment, a second sealing plug 23 is provided at one end of the valve seat cavity 2 away from the valve rod cavity 3, and the second sealing plug 23 is provided in a cylindrical structure. One end of the second sealing plug 23 close to the valve rod cavity 3 is provided with an opening, and one end of the second sealing plug 23 far away from the valve rod cavity 3 is sealed; the elastic piece 22 and at least part of the valve core 21 are arranged inside the second sealing plug 23, and the central axis of the first communicating hole 11 coincides with the central axis of the second sealing plug 23.

When the high-pressure valve of the present invention is opened or closed, the second sealing plug 23 can be used to guide the movement direction of the valve core 21, so that the user can conveniently push the valve core 21 through the valve rod 31 to open the communicating hole, or the elastic piece 22 can conveniently push the valve core 21 to reset and block the first communicating hole 11; and when the high-pressure valve of the present invention is closed, the user only needs to release the external force applied to the adjusting assembly 43 to remove the pushing force transmitted from the valve rod 31 to the valve core 21, so that the valve core 21 is pushed to reset by the elastic tension of the elastic piece 22, and the valve core 21 is reset to block the first communicating hole 11 communicated with the valve rod cavity 3 and the valve seat cavity 2.

Preferably, the second sealing plug 23 is in threaded connection with the inner wall of the valve body 1, and a first sealing groove 231 is arranged on the periphery of one end of the second sealing plug 23 close to the valve seat cavity 2; a first sealing ring 232 is arranged in the first sealing groove 231, and the high-pressure water in the valve seat cavity 2 is prevented from flowing out along a gap between the second sealing plug 23 and the inner wall of the valve body 1 due to the arrangement of the first sealing ring 232, thereby avoiding water leakage of the valve body 1.

Preferably, a valve seat 24 is arranged in the valve seat cavity 2, and the valve seat 24 is arranged on one side of the first communicating hole 11 away from the valve rod cavity 3; a gap is reserved between the valve seat 24 and the end of the second sealing plug 23, and a second sealing ring 25 is sleeved on the periphery of the valve seat 24. When the high-pressure valve in the embodiment is in an open state, the high-pressure water flowing from the water inlet 13 into the valve seat cavity 2 enters the valve rod cavity 3 along the gap between the valve seat 24 and the second sealing plug 23 and the first communicating hole 11, and is finally ejected from the water outlet 14.

The valve seat 24 is arranged in the valve seat cavity 2, and the valve seat 24 is used for protecting the first communicating hole 11 in the valve body 1, so that the first communicating hole 11 is prevented from being damaged due to the fact that the valve core 21 directly impacts the wall edge of the first communicating hole 11, therefore, the high-pressure valve is prevented from discharging water when the high-pressure valve is in a closed state due to the fact that the communicating hole is damaged, and the service life of the high-pressure valve is prolonged; in addition, the second sealing ring 25 is sleeved on the outer periphery of the valve seat 24, so that the tightness between the valve seat cavity 2 and the valve rod cavity 3 is improved, and high-pressure water is prevented from flowing along the gap between the valve seat cavity 2 and the valve rod cavity 3 when the high-pressure valve is not opened.

Further, the cylinder wall of the second sealing plug 23 is provided with a communicating inlet 233. By providing the communicating inlet 233, the communicating area between the water inlet 13 and the valve seat cavity 2 is increased, which facilitates the high-pressure water in the water inlet to enter the valve seat cavity 2.

Further, the aperture of the communicating inlet 233 is smaller than outer diameter of the valve core 21. When the valve core 21 is pushed into the second sealing plug 23 by the valve rod 31, the valve core 21 is prevented from falling into the water inlet 13 through the communicating inlet 233, and even the water inlet 13 is blocked so that high-pressure water cannot enter the valve seat cavity 2 through the water inlet 13, thereby ensuring that the water inlet speed is not affected.

Understandably, if the diameter of the communicating inlet 233 is larger than outer diameter of the valve core 21, the communicating inlet 233 and the water inlet 13 need to be staggered during the production and assembly process, so as to avoid the valve core 21 falling into the water inlet 13 through the communicating inlet 233, which makes assembly troublesome; while in the embodiment, the aperture of the communicating inlet 233 is smaller than outer diameter of the valve core 21, so that it is not necessary to consider whether the communicating inlet 233 is misaligned with the water inlet 13 during the production and assembly of the high-pressure valve of the present invention, and the assembly is simple and convenient, which can reduce the production time of the high-pressure valve of the present invention.

Preferably, a third sealing plug 44 is arranged on one side of the adjusting cavity 4 far away from the valve rod cavity 3, wherein the third sealing plug 44 is provided with a mounting hole through which the adjusting rod 432 passes through, and a first pressure-reducing stopper 45 is arranged on one side of the third sealing plug 44 close to the adjusting cavity 4, that is, the first pressure-reducing stopper 45 is arranged between the third sealing plug 44 and the adjusting head 431, so as to prevent the high-pressure water entering the pressure-reducing cavity 41 from directly impacting the third sealing plug 44 and affecting the installation stability of the third sealing plug 44.

A third sealing ring 46 and a first washer 461 are arranged between the third sealing plug 44 and the adjusting rod 432, wherein the first gasket 461 is located between the third sealing ring 46 and the third sealing plug 44 to improve the tightness of the mounting hole, thereby improving the tightness of the adjusting cavity 4. By arranging the first washer 461 between the third sealing plug 44 and the third sealing ring 46, the third sealing ring 46 is prevented from being squeezed into the mounting hole during the movement of the adjusting rod 432, thereby affecting the movement of the adjusting rod 432 in the mounting hole.

The third sealing plug 44 comprises a first part located at the end of the adjusting cavity 4 and a second part inserted into the adjusting cavity 4, wherein a fourth sealing ring 441 is sleeved on the periphery of the second part, and the fourth sealing ring 441 is used for sealing a gap between the inner wall of the valve body 1 and the second part, so as to prevent the high-pressure water in the pressure-reducing cavity 41 from flowing out along the gap between the third sealing plug 44 and the inner wall of the valve body 1.

A fifth sealing ring 442 is provided at the joint between the first part and the second part of the third sealing plug 44, and the fifth sealing ring 442 is used for sealing the mounting hole to avoid water leakage. Specifically, a second sealing groove 443 is provided at the joint between the first part and the second part, the fifth sealing ring 442 is embedded in the second sealing groove 443, and the second sealing groove 443 restricts the position of the fifth sealing ring 442 to prevent the position of the fifth sealing ring from being misaligned, so as to ensure the sealing assembly effect of the third sealing plug 44 and the adjusting cavity 4.

Further, the pressure-reducing cavity 41 is formed by the first pressure-reducing stopper 45 and the adjusting head 431, wherein the first pressure-reducing stopper 45 is provided with a plurality of water inlet slots 451, and the plurality of water inlet slots 451 are uniformly distributed in a radial manner. When assembling the high-pressure valve of the present invention, only the first pressure-reducing stopper 45 is required to be sleeved on the adjusting rod 432 and installed in the adjusting cavity 4, and the position of the water inlet slot 451 is not required to be adjusted, so that the pressure-reducing cavity 41 is connected to the communicating pipe 16 through the water inlet slot 451 and then communicated with the water inlet 13, making assembly simple and convenient; Meanwhile, it is convenient for the high-pressure water at the water inlet 13 to flow into the pressure-reducing cavity 41 through the water inlet slot 451, so that the water pressure at the water inlet 13 is kept the same as the water pressure in the pressure-reducing cavity 41.

Further, a first adjusting cylinder 47 is arranged in the adjusting cavity 4, and the first adjusting cylinder 47 is sleeved on the periphery of the adjusting head 431, wherein a sealing ring 4311 is arranged between the adjusting head 431 and the first adjusting cylinder, and the sealing ring 4311 is used for isolating the buffer cavity 42 from the pressure-reducing cavity 41.

Preferably, a sixth sealing ring 471 is arranged between the outer periphery of the first adjusting cylinder 47 and the inner wall of the valve body 1, wherein the sixth sealing ring 471 is used to further isolate the buffer cavity 42 from the pressure-reducing cavity 41, so as to prevent the high-pressure water in the pressure-reducing cavity 41 from entering the buffer cavity 42. The first adjusting cylinder 47 is provided with a first buffer through hole 472 for communicating the buffer cavity 42 with the through hole 15.

The first adjusting cylinder 47 is provided with at least two first buffer through holes 472, wherein the first buffer through holes 472 are uniformly distributed on the same circumference. It can be understood that the air in the buffer cavity 42 is pushed by the adjusting head 431 to be discharged to the outside of the first adjusting cylinder 47 along the first buffer through hole 472, and finally discharged to the outside of the valve body 1 through the through hole 15, so as to prevent the air in the buffer cavity 42 from generating large air pressure due to the volume compression of the air in the buffer cavity, hindering the adjusting head 431 from moving toward the valve rod cavity 3, and affecting the opening of the high-pressure valve of the present invention.

Preferably, a seventh sealing ring 48 and a second washer 481 are arranged in the adjusting cavity 4, wherein the seventh sealing ring 48 and the second washer 481 are close to the second communicating hole 12 communicated with the adjusting cavity 4 and the valve rod cavity 3 and are sleeved on the valve rod 31, and the seventh sealing ring 48 is located between the second communicating hole 12 and the second washer 481. The seventh sealing ring 48 is arranged in the adjusting cavity 4 to seal the second communicating hole 12 communicated with the adjusting cavity 4 and the valve rod cavity 3, so that the high-pressure water in the valve rod cavity 3 is prevented from flowing into the adjusting cavity 4 through the second communicating hole 12, thereby avoiding water leakage; in addition, by setting a second washer 481 in the adjusting cavity 4 to clamp the seventh sealing ring 48, the seventh sealing ring 48 is prevented from sliding in the direction away from the second communicating hole 12 along the valve rod 31 due to the water pressure of the high-pressure water in the valve rod cavity 3, which may affect its sealing effect at the second communicating hole 12.

Preferably, a limiting clamp hole is formed between one end of the adjusting cavity 4 close to the second communicating hole 12 of the valve seat cavity 2 and the inner wall of the valve body 1, and the seventh sealing ring 48 and the second washer 481 are installed in the limiting clamp hole, wherein the second washer 481 is in interference fit with the limiting clamp hole, to improve the installation stability of the seventh sealing ring 48 and the second washer 481, and further to improve the sealing effect at the second communicating hole 12.

The embodiment also provides a high-pressure water gun, wherein the high-pressure valve provided by the embodiment is arranged in the high-pressure water gun.

When the high-pressure valve provided by the embodiment is applied in a high-pressure water gun, the force application end of the adjusting assembly 43 corresponds to the wrench part of the high-pressure water gun, the water inlet 13 corresponds to the water inlet of the high-pressure water gun, and the water outlet 14 corresponds to the water spraying part of the high-pressure water gun, and the user can drive the valve rod 31 to push the valve core 21 to move by pressing the wrench part, so that the valve seat cavity 2 is communicated with the valve rod cavity 3, then the high-pressure water passes through the valve seat cavity 2 and the valve rod cavity 3 in turn, and is finally sprayed from the water spraying part of the high-pressure water gun.

According to the description above, the user can switch on the high-pressure water gun only by applying a small force to the wrench part without pulling the trigger for a long time, which can effectively reduce the fatigue degree of the hand of the user caused by pulling the trigger of the high-pressure water gun for a long time, and solve the problem of hand fatigue when the existing high-pressure water gun is used.

It could be understood that under the guidance of the above embodiments, those skilled in the filed can combine various implementation methods in the above embodiments to obtain technical solutions of multiple implementation methods.

The above description is only a preferred embodiment of the present application and is not to limit the present utility patent. Any modifications, equivalent substitutions and improvements made within the spirit and principles of the present application should be included in the protection scope of the present application.

What is claimed is:

1. A high-pressure valve, comprises a valve body, wherein the valve body comprises a valve seat cavity, a valve rod cavity and an adjusting cavity; the valve rod cavity is arranged between the adjusting cavity and the valve seat cavity; the valve rod cavity is communicated with the valve seat cavity through a first communicating hole, and is communicated with the adjusting cavity through a second communicating hole;

the valve body is also provided with a water inlet and a water outlet, wherein the water inlet is communicated with the valve seat cavity; and the water outlet is communicated with the valve rod cavity;

the valve seat cavity is internally provided with a valve core and an elastic piece, wherein the elastic piece provides an acting force for the valve core to move towards the first communicating hole;

a valve rod is arranged in the valve rod cavity, wherein two ends of the valve rod are respectively inserted into the first communicating hole and the second communicating hole; an adjusting assembly is arranged in the adjusting cavity; one end of the adjusting assembly is connected with the valve rod, and another end of the adjusting assembly extends to the outside of the valve body;

the adjusting assembly comprises an adjusting head and an adjusting rod, wherein the adjusting head is arranged at one end of the adjusting rod close to the valve rod, a radial section of the adjusting head is larger than that of the adjusting rod; the adjusting head divides the adjusting cavity into a pressure-reducing cavity and a buffer cavity; the pressure-reducing cavity is positioned at one side of the buffer cavity far away from the valve rod cavity and is communicated with the water inlet or the water outlet; the buffer cavity is communicated with external environment.

2. A high-pressure water gun, comprises the high-pressure valve according to claim 1.

3. The high-pressure valve according to claim 1, wherein a communicating pipe is arranged in the valve body and is used for communicating the pressure-reducing cavity with the water inlet or communicating the pressure-reducing cavity with the water outlet.

4. A high-pressure water gun, comprises the high-pressure valve according to claim 3.

5. The high-pressure valve according to claim 3, wherein the communicating pipe comprises a water outlet pipe and a first inclined water outlet pipe; one end of the water outlet pipe is communicated with the water inlet, and another end of the water outlet pipe is communicated with the first inclined water outlet pipe; and one end of the first inclined water outlet pipe far away from the water outlet pipe is communicated with the pressure-reducing cavity.

6. A high-pressure water gun, comprises the high-pressure valve according to claim 5.

7. The high-pressure valve according to claim 5, wherein the central axis of the water outlet pipe is parallel to the central axis of the valve rod cavity, and the first inclined water outlet pipe extends obliquely toward the water outlet pipe.

8. A high-pressure water gun, comprises the high-pressure valve according to claim 7.

9. The high-pressure valve according to claim 1, wherein a second sealing plug is arranged at one end of the valve seat cavity away from the valve rod cavity; the second sealing plug is of a cylindrical structure; an opening is arranged at one end of the second sealing plug close to the valve rod cavity, and one end of the second sealing plug away from the valve rod cavity is sealed; the elastic piece and at least a part of the valve core are arranged inside the second sealing plug, and the central axis of the first communicating hole coincides with the central axis of the second sealing plug.

10. A high-pressure water gun, comprises the high-pressure valve according to claim 9.

11. The high-pressure valve according to claim 9, wherein the cylinder wall of the second sealing plug is provided with a communicating inlet, and aperture of the communicating inlet is smaller than outer diameter of the valve core.

12. A high-pressure water gun, comprises the high-pressure valve according to claim 11.

13. The high-pressure valve according to claim 11, wherein the pressure-reducing cavity is formed by enclosing the first pressure-reducing stopper and the adjusting head; the first pressure-reducing stopper is provided with a plurality of water inlet slots; the water inlet slots are radially and uniformly distributed, and the high-pressure water flows into the pressure-reducing cavity after passing through the communicating pipe and the water inlet slots in turn.

14. A high-pressure water gun, comprises the high-pressure valve according to claim 13.

15. The high-pressure valve according to claim 1, wherein a third sealing plug is arranged on one side of the adjusting cavity away from the valve rod cavity; the third sealing plug is provided with a mounting hole through which the adjusting rod passes, and a first pressure-reducing stopper is arranged on one side of the third sealing plug close to the adjusting cavity.

16. A high-pressure water gun, comprises the high-pressure valve according to claim 15.

* * * * *